(12) United States Patent
Teetzel et al.

(10) Patent No.: US 11,612,207 B2
(45) Date of Patent: Mar. 28, 2023

(54) HELMET WITH INTEGRATED SENSORS

(71) Applicant: Wilcox Industries Corp., Newington, NH (US)

(72) Inventors: James W. Teetzel, Portsmouth, NH (US); John P. Bousquet, Rochester, NH (US); Gary M. Lemire, Lee, NH (US)

(73) Assignee: Wilcox Industries Corp., Newington, NH (US)

( * ) Notice: Subject to any disclaimer, the term of this patent is extended or adjusted under 35 U.S.C. 154(b) by 272 days.

(21) Appl. No.: 16/242,246

(22) Filed: Jan. 8, 2019

(65) Prior Publication Data

US 2019/0208854 A1 Jul. 11, 2019

Related U.S. Application Data

(60) Provisional application No. 62/614,765, filed on Jan. 8, 2018.

(51) Int. Cl.
| | |
|---|---|
| *A42B 3/04* | (2006.01) |
| *A42B 3/30* | (2006.01) |
| *F41H 1/04* | (2006.01) |
| *G01S 19/13* | (2010.01) |

(52) U.S. Cl.
CPC ............ *A42B 3/30* (2013.01); *A42B 3/04* (2013.01); *A42B 3/042* (2013.01); *A42B 3/0433* (2013.01); *A42B 3/0446* (2013.01); *F41H 1/04* (2013.01); *G01S 19/13* (2013.01)

(58) Field of Classification Search
CPC .. A42B 3/30; A42B 3/042; A42B 3/04; A42B 3/044; A42B 3/0406; A42B 3/0433
See application file for complete search history.

(56) References Cited

U.S. PATENT DOCUMENTS

| | | | | |
|---|---|---|---|---|
| 4,517,417 | A * | 5/1985 | Murayama | A42B 3/30 381/86 |
| 4,970,589 | A * | 11/1990 | Hanson | G02B 27/023 398/131 |
| 5,136,657 | A * | 8/1992 | Hattori | A42B 3/127 379/430 |
| 6,101,256 | A * | 8/2000 | Steelman | H04R 5/023 381/122 |
| 6,507,280 | B2 * | 1/2003 | Tabata | A42B 3/303 455/90.3 |
| 6,730,047 | B2 * | 5/2004 | Socci | A63B 69/0024 600/595 |
| 7,219,370 | B1 | 5/2007 | Teetzel et al. | |

(Continued)

FOREIGN PATENT DOCUMENTS

EP 3508087 B1 10/2020

*Primary Examiner* — Jillian K Pierorazio
(74) *Attorney, Agent, or Firm* — McLane Middleton, Professional Association

(57) ABSTRACT

A ballistic helmet system having an integrated circuit layer electrically coupled to one or more powered devices, where the ballistic helmet is configured to operate and control the powered devices. The ballistic helmet system comprises a base layer configured to retain the circuit layer. The circuit layer comprises one or more circuit substrates, which may be formed of a flexible material capable of withstanding elevated temperatures that may result from the bonding and curing process of the helmet components.

25 Claims, 12 Drawing Sheets

(56) References Cited

U.S. PATENT DOCUMENTS

| | | | | |
|---|---|---|---|---|
| 7,234,831 B1* | 6/2007 | Hanley | | A42B 1/244 |
| | | | | 2/209.13 |
| 8,364,220 B2* | 1/2013 | Sandmore | | A42B 1/242 |
| | | | | 600/323 |
| 8,531,592 B2* | 9/2013 | Teetzel | | H04N 9/79 |
| | | | | 348/373 |
| 8,826,463 B2 | 9/2014 | Teetzel et al. | | |
| 8,908,389 B2 | 12/2014 | Teetzel et al. | | |
| 8,984,665 B2 | 3/2015 | Celona et al. | | |
| 9,101,175 B2 | 8/2015 | Redpath et al. | | |
| 9,622,529 B2 | 4/2017 | Teetzel et al. | | |
| 10,171,719 B1* | 1/2019 | Fitzgerald | | A42B 1/006 |
| 10,219,571 B1* | 3/2019 | Aloumanis | | G08G 1/167 |
| 10,557,687 B2 | 2/2020 | Teetzel et al. | | |
| 2003/0122958 A1* | 7/2003 | Olita | | H04N 5/23293 |
| | | | | 348/E5.025 |
| 2007/0214551 A1 | 9/2007 | Teetzel et al. | | |
| 2008/0130272 A1* | 6/2008 | Waters | | A42B 1/244 |
| | | | | 2/209.13 |
| 2008/0263750 A1* | 10/2008 | Chen | | A42B 1/245 |
| | | | | 2/209.13 |
| 2010/0242155 A1* | 9/2010 | Carullo, Jr. | | A61N 5/0617 |
| | | | | 2/171.2 |
| 2010/0245585 A1* | 9/2010 | Fisher | | H04M 1/0266 |
| | | | | 348/164 |
| 2011/0069476 A1* | 3/2011 | Lombard | | F21V 23/0435 |
| | | | | 362/105 |
| 2011/0145981 A1* | 6/2011 | Teetzel | | G02B 23/125 |
| | | | | 2/422 |
| 2011/0239354 A1 | 10/2011 | Celona et al. | | |
| 2012/0075168 A1* | 3/2012 | Osterhout | | G06F 3/011 |
| | | | | 345/8 |
| 2012/0175496 A1* | 7/2012 | Vorovitchik | | G01C 21/02 |
| | | | | 250/206.2 |
| 2013/0086722 A1* | 4/2013 | Teetzel | | H02J 1/00 |
| | | | | 2/2.5 |
| 2013/0185837 A1* | 7/2013 | Phipps | | A42B 3/20 |
| | | | | 2/2.5 |
| 2013/0192961 A1* | 8/2013 | Waters | | F21V 5/04 |
| | | | | 220/379 |
| 2014/0000013 A1* | 1/2014 | Redpath | | H05K 1/028 |
| | | | | 2/422 |
| 2014/0020159 A1 | 1/2014 | Teetzel et al. | | |
| 2014/0049947 A1* | 2/2014 | Lombard | | A41D 19/0157 |
| | | | | 362/105 |
| 2014/0229877 A1* | 8/2014 | Adegbola | | G06F 3/04815 |
| | | | | 715/771 |
| 2014/0270685 A1* | 9/2014 | Letke | | H04N 5/2251 |
| | | | | 362/106 |
| 2014/0296669 A1* | 10/2014 | Gertsch | | A61B 5/01 |
| | | | | 600/324 |
| 2014/0304891 A1* | 10/2014 | Waters | | A42B 1/24 |
| | | | | 2/209.13 |
| 2014/0373423 A1 | 12/2014 | Teetzel et al. | | |
| 2016/0015109 A1* | 1/2016 | Anwar | | H04N 5/2253 |
| | | | | 348/78 |
| 2016/0106174 A1* | 4/2016 | Chung | | A42B 3/0433 |
| | | | | 340/539.13 |
| 2017/0119078 A1* | 5/2017 | Chen | | A42B 3/08 |
| 2017/0205202 A1 | 7/2017 | Teetzel et al. | | |
| 2017/0309152 A1* | 10/2017 | Dinkins | | G08B 21/043 |
| 2018/0356709 A1* | 12/2018 | Duncan | | H04N 5/2254 |
| 2019/0104797 A1 | 4/2019 | Teetzel et al. | | |
| 2019/0208854 A1 | 7/2019 | Teetzel et al. | | |
| 2021/0315314 A1 | 10/2021 | Teetzel et al. | | |

* cited by examiner

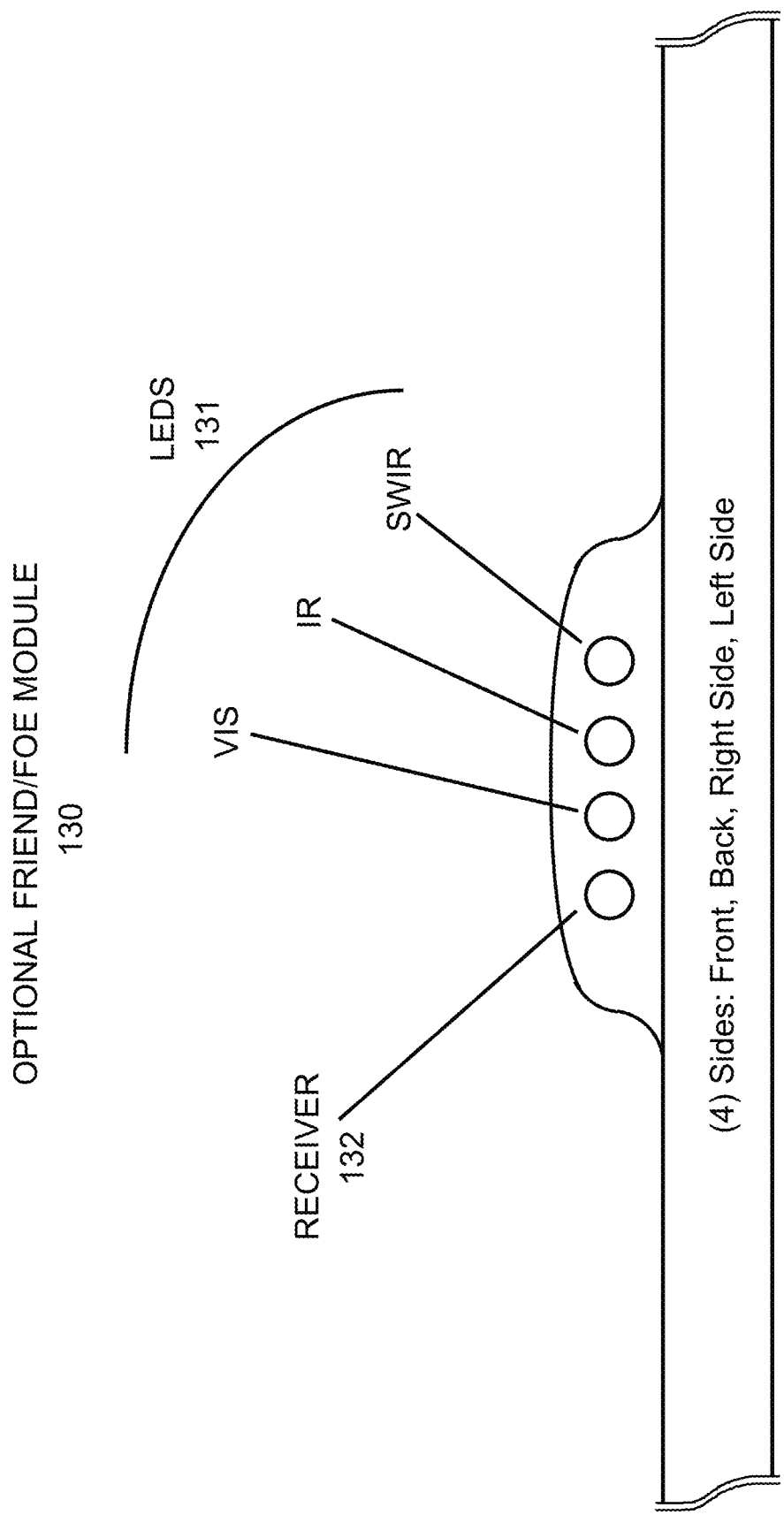

HELMET WITH INTEGRATED SENSORS

CROSS REFERENCE TO RELATED APPLICATION

This application claims the priority benefit of provisional application No. 62/614,765 filed Jan. 8, 2018. The aforementioned application is incorporated herein by reference in its entirety.

BACKGROUND

The present invention relates generally to protective helmets such as ballistic helmets or other helmets having a similar construction, such as a ballistic tactical helmet for use by law enforcement personnel, military field or combat helmets, or the like. More particularly, the present disclosure relates to a helmet housing circuit boards for controlling one or more electrical or electronic accessory devices or components attached, integrated, or mounted to the helmet.

Commonly, a military ballistic helmet or the like is configured to carry one or more accessories or attachments, such as flashlights, viewing optics and devices, such as a number of sensors, cameras, monocular, binoculars, monocular or binocular night vision devices (including passive night vision (NVG) devices and enhanced night vision (eNVG) devices), thermal imaging devices, cameras (including without limitation visible light camera, thermal cameras, short wave infrared (SWIR) cameras and so forth), identification friend or foe (IFF) systems, communications devices, and so forth.

The helmet may be provided with a plurality of openings or holes therein for mounting such accessories to the helmet or for receiving fasteners or other mounting mechanisms or hardware such as threaded fasteners, brackets, grommets, etc. By way of example, the front of a helmet may have openings and holes for mounting an accessory such as a flashlight or a bracket or shroud which can accept a helmet mount for a viewing device as described above. Similarly, holes or vias through the ballistic material may be provided in order to provide an electrical connection or signal transmission, e.g., between a power supply mounted at one location on the helmet, e.g., at the rear of the helmet, and an accessory or device located at another position on the helmet, e.g., by running an electrical cable along the interior of the helmet. Such hardware or openings which penetrate the ballistic shell, either partially or completely, compromise the anti-ballistic properties of the helmet in these regions. The number and complexity of helmet mounted components are increasing, and such components may be computer or microcontroller-based and controlled through the use of electronic signals and sensors, thus resulting in larger and more complex wiring assemblies and posing difficulties in installing such devices while maintaining the ballistic integrity of the helmet.

Therefore, there exists a need for an improved method of integrating accessories and electrical interconnection devices into a ballistic or non-ballistic helmet which could replace the surface mounting and wiring typically used for electrical power, data, and/or signal transmission and which would reduce wiring complexity, simplify helmet assembly and device attachment, reduce weight, and allow for additional functionality.

SUMMARY

In one aspect, a ballistic helmet system having an integrated circuit layer electrically coupled to one or more powered devices is provided, where the ballistic helmet is configured to operate and control the powered devices. The ballistic helmet system comprises a base layer configured to retain the circuit layer. The circuit layer comprises one or more circuit substrates, which may be formed of a flexible material capable of withstanding elevated temperatures that may result from the bonding and curing process of the helmet components.

In a more limited aspect, a ballistic helmet system having a circuit layer includes communications antennas that may be formed on the circuit substrate and are electrically coupled to a communications devices configured for wireless communications.

In another more limited aspect, a ballistic helmet system comprises a combat identification system, such as a friend or foe (IFF) system.

In another more limited aspect, the ballistic helmet comprises a housing, wherein the brim of the housing contains buttons, keypads, or the like, for controlling the functions and devices integrated into the helmet. In certain preferred embodiments, the controls are situated for ease of access by the wearer while the helmet is in use.

In another more limited aspect, a ballistic helmet system comprises one or more video and/or control circuit boards for controlling one or more image sensors and cameras integrated into the ballistic helmet. The helmet system includes a low lux camera, left and right side cameras, and a rear camera. In certain preferred embodiments, the ballistic helmet system includes video controls for controlling operation of the camera system.

In another more limited aspect, a ballistic helmet system comprises a positioning system, such as a celestial camera system positioned at the top of the helmet, for calculating the position of the wearer.

In another more limited aspect, a ballistic helmet system includes one or more motion sensors positioned around the ballistic helmet. The motion sensors may be passive infrared, ultrasonic, microwave, or image sensor based motion detectors. In certain embodiments, the motion sensors may notify the wearer of activity detected from a certain direction through an alert. In certain further embodiments, the motion sensors may be operatively connected to cameras activated by proximity or by detection of motion, upon which the camera will transmit images or video captured to a display screen.

In another more limited aspect, a ballistic helmet system includes a mounting assembly configured to removably attach an additional device. The additional device may draw power from the ballistic helmet. In certain embodiments, the mounting assembly includes a pivot assembly to allow the additional device, such as a viewing device, to pivot away from the user's line of sight when the additional device is not in use. In certain embodiments, where the additional device is a viewing device, certain features, such as the video and control circuit boards, may be integrated into the helmet to reduce the size and weight of the additional device.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 12 is an enlarged, fragmentary view of the helmet illustrating an optional identification friend or foe module.

DETAILED DESCRIPTION OF THE PREFERRED EMBODIMENTS

Figure 1:
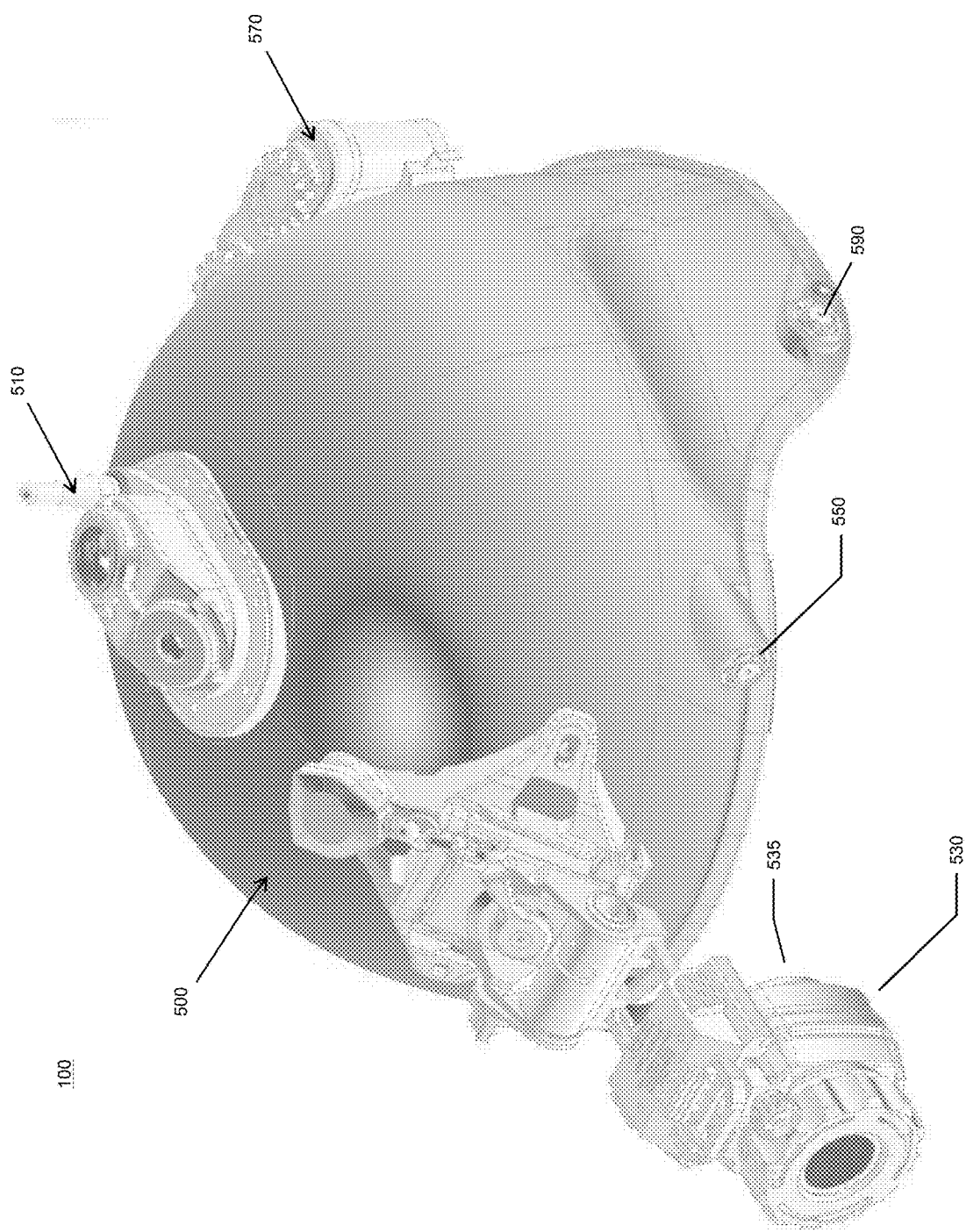
FIG. 1 is an isometric view of an exemplary helmet in accordance with the present disclosure, taken generally from the front and left side.
Figure 2:
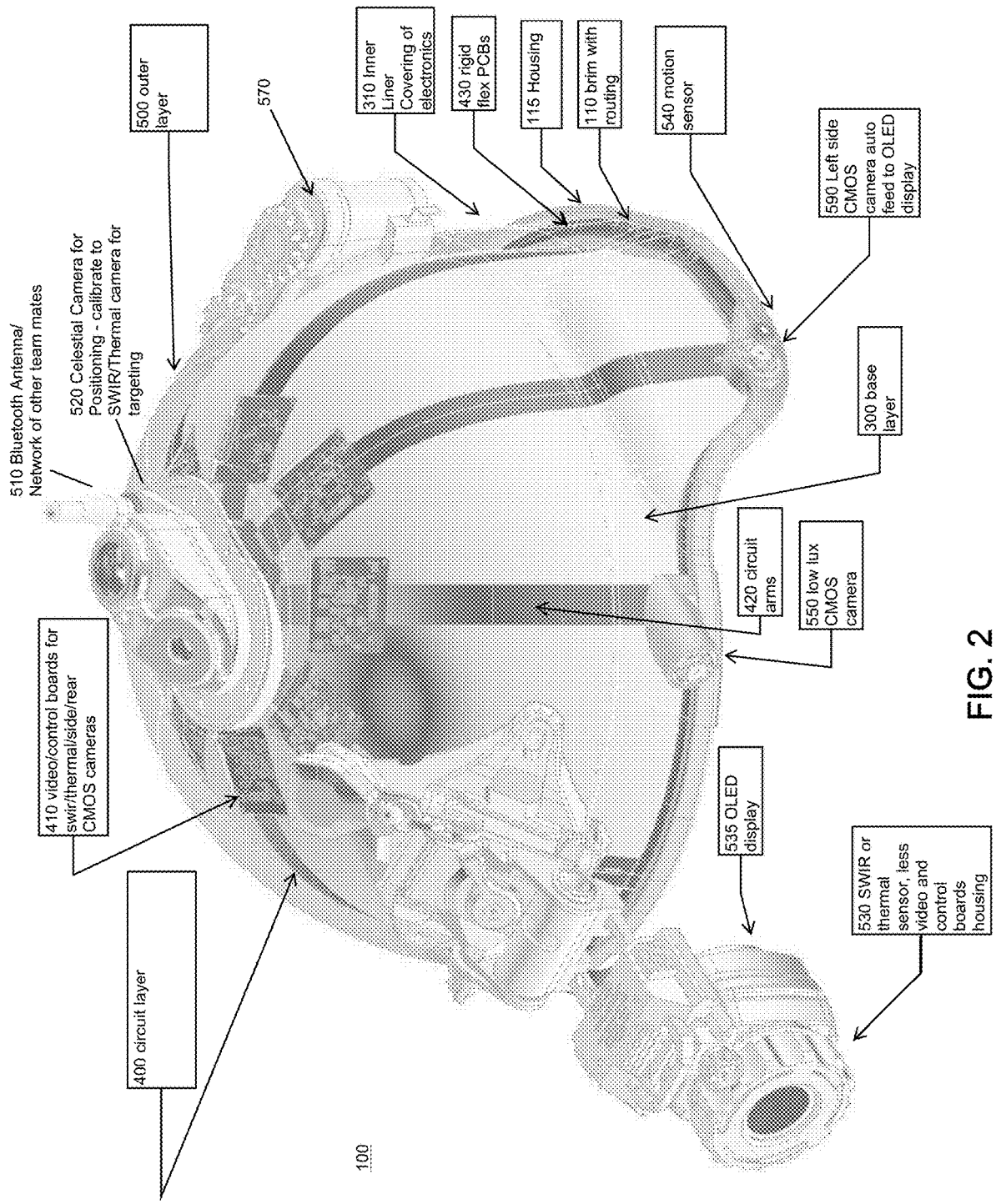
FIG. 2 is an isometric view of the helmet appearing in FIG. 1, taken generally from the front and left side, with the outer layer removed for ease of exposition.
Figure 3:
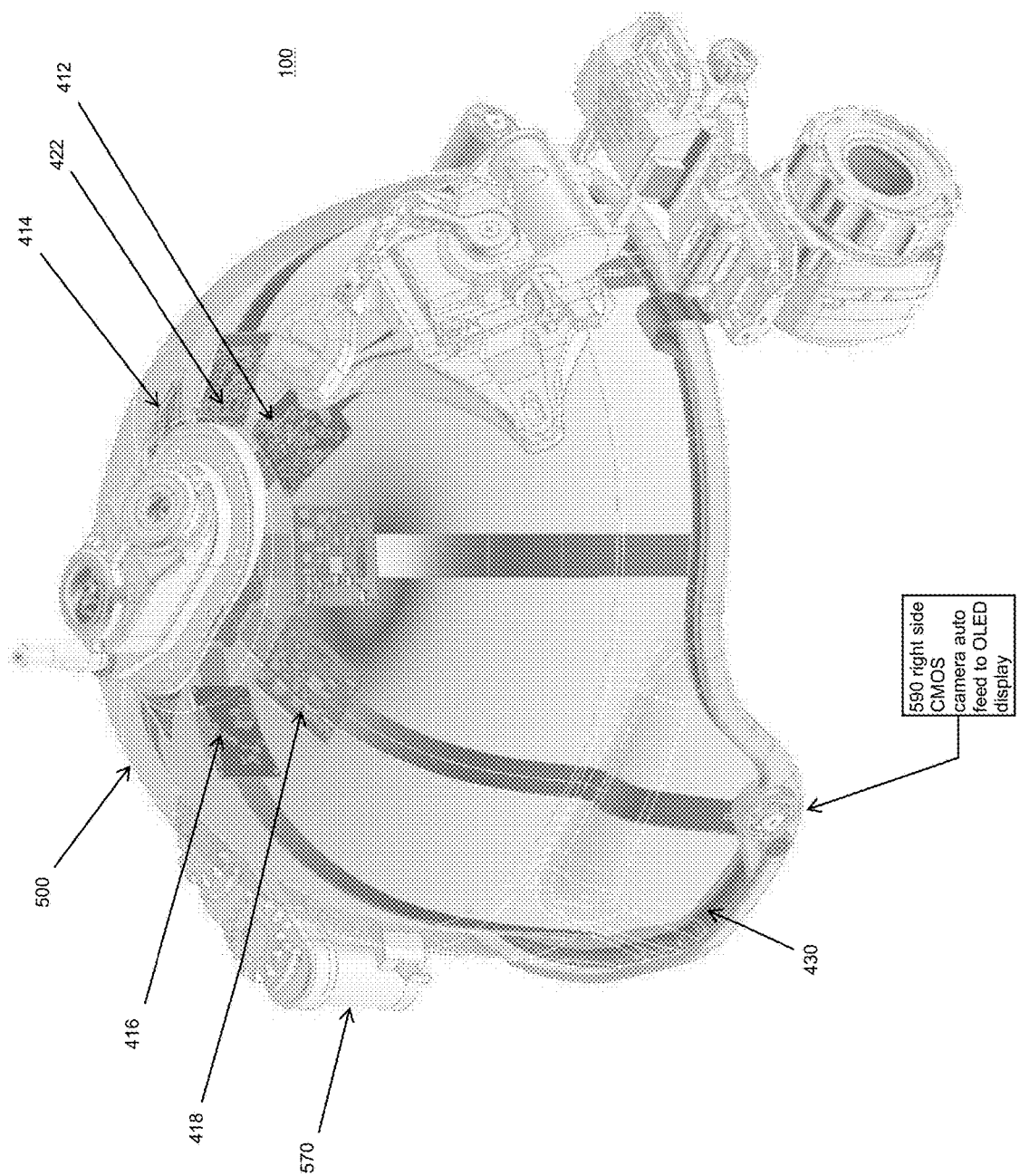
FIG. 3 is another isometric view of the helmet appearing in FIG. 1, taken generally from the front and right side, with the outer layer removed for ease of exposition.
Figure 4:
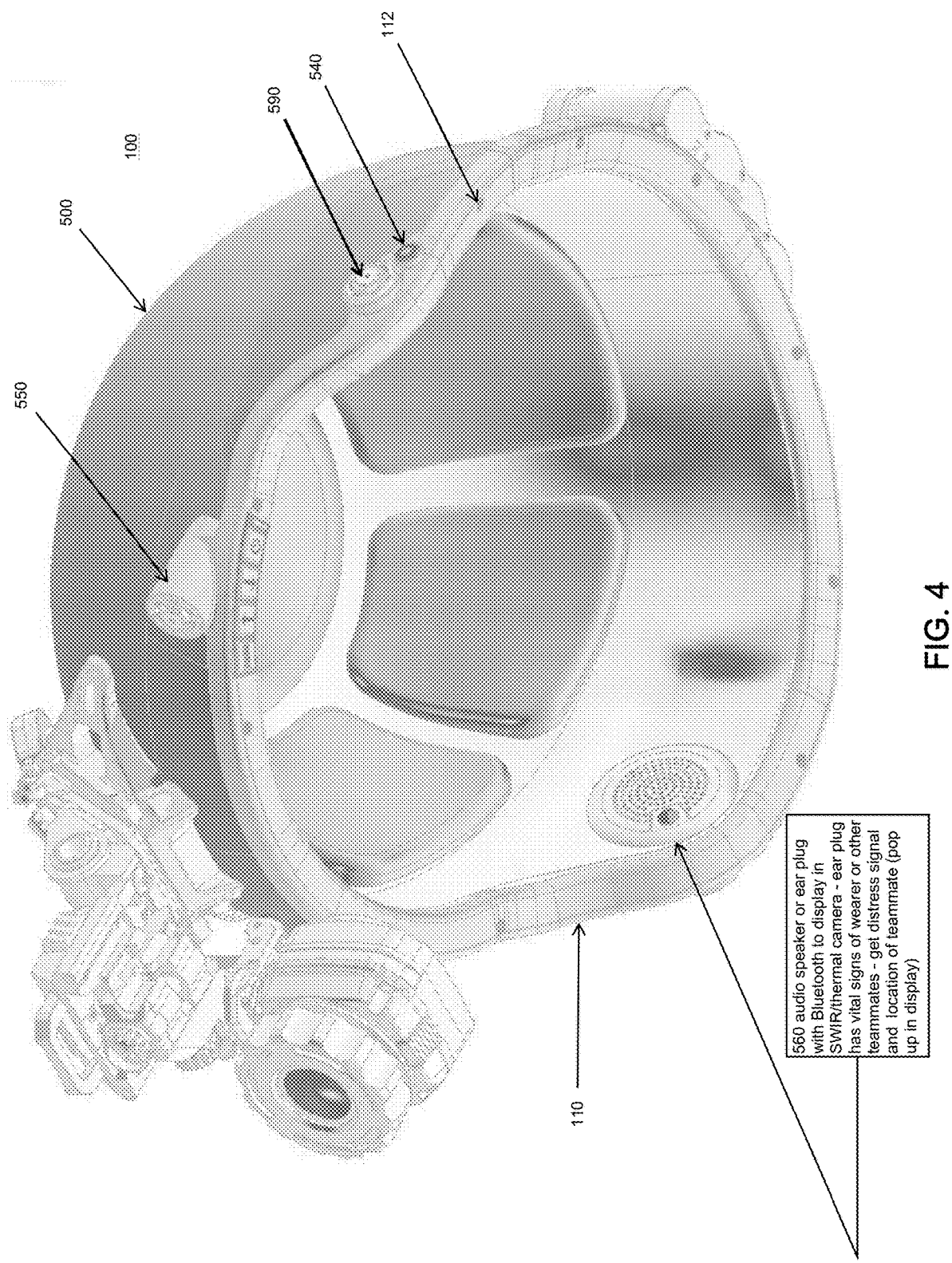
FIG. 4 is an isometric view of the embodiment appearing in FIG. 1, taken generally from the bottom and left side.

Referring now to the drawings, FIGS. 1-12 illustrate a ballistic helmet 100 which includes a ballistic shell or base layer 300, an intermediate circuit layer 400, and an outer layer(s) 500 (shown in phantom in FIG. 2) formed in accordance with an embodiment of the present disclosure.

In certain embodiments, the base layer 300 may comprise a molded helmet base, e.g., formed by laying up and molding, on a generally helmet shaped pre-form, multiple plies of a fiber reinforced composite material, such as aramid fibers (e.g., KEVLAR®) or other ballistic fiber impregnated with a polymer resin. Other ballistic and non-ballistic helmet types, including metal helmets, are also contemplated. In certain embodiments, the base layer may be formed of a molded ballistic polymer construction. An example of a ballistic helmet into which an integrated accessory mounting and electrical interconnection may be provided includes ballistic helmets available from Ceradyne under the product name SEAMLESS BALLISTIC® Helmet. It will be recognized that the present laminated construction in accordance with this disclosure may be adapted for use with a base component 300 formed of other materials, including other plastic or metal helmet types. The base layer may be a finished helmet or, alternatively, may be an unfinished helmet. When the base layer 300 is a finished helmet, the outer layer 500 serves to retain the circuit layer 400 and integrated devices. In certain embodiments, the outer layer 500 may comprise one or more plies of a ballistic fiber reinforced composite material which contributes to the anti-ballistic properties of the finished helmet. In certain embodiments, the helmet also comprises an inner liner cover 310 which is situated between the circuit layer 400 and the outer layer 500.

The circuit layer 400 includes one or more circuit substrates 420 which may be formed of a flexible material, such as a flexible film or tape, e.g., polyimide, polyester, or other material that is able to withstand the elevated temperatures that may result from the bonding and curing of the helmet 100 components. A conductive, e.g., metalized, pattern is formed on the substrate 420 and is comprised of one or more conductive pathways to provide power, control, and/or data signals, e.g. between integrated sensors and functions or between integrated sensors and the power source. The electrically conductive pattern may be formed via etching, depositing, printing (e.g., using conductive ink containing carbon or other conductive filler), electroplating, or the like to provide a desired conductive pattern. Although the illustrated circuit substrate is shown with a plurality of circuit strips extending radially outwardly from the center of the helmet 100, any desired number of substrates in other shapes and configurations are also contemplated.

In addition, circuit components such as one or more antennas may be formed as a part of the electrically conductive pattern on the circuit substrates. For example, one or more communications antennas may be formed on the circuit substrate and electrically coupled to a communications device, which may include one or more RF transceivers 412, of the type which provides wireless communications between devices or between the wearer and other operators. Such communications device may be mounted on the helmet and electrically coupled to the antennas via exposed terminals on the circuit. Other antenna types contemplated are radio frequency identification (RFID) antenna(s) for coupling to an RFID device; or GPS antenna(s) for coupling to a navigation system worn by the user and either mounted to the helmet system 100 herein or worn or carried elsewhere on the user and eclectically coupled via an adapter. In certain embodiments, the RF transceiver(s) is/are provided on the helmet logic/circuit boards 410. In certain embodiments, the transceiver(s) 412 include one or more Bluetooth transceivers.

Figure 5:
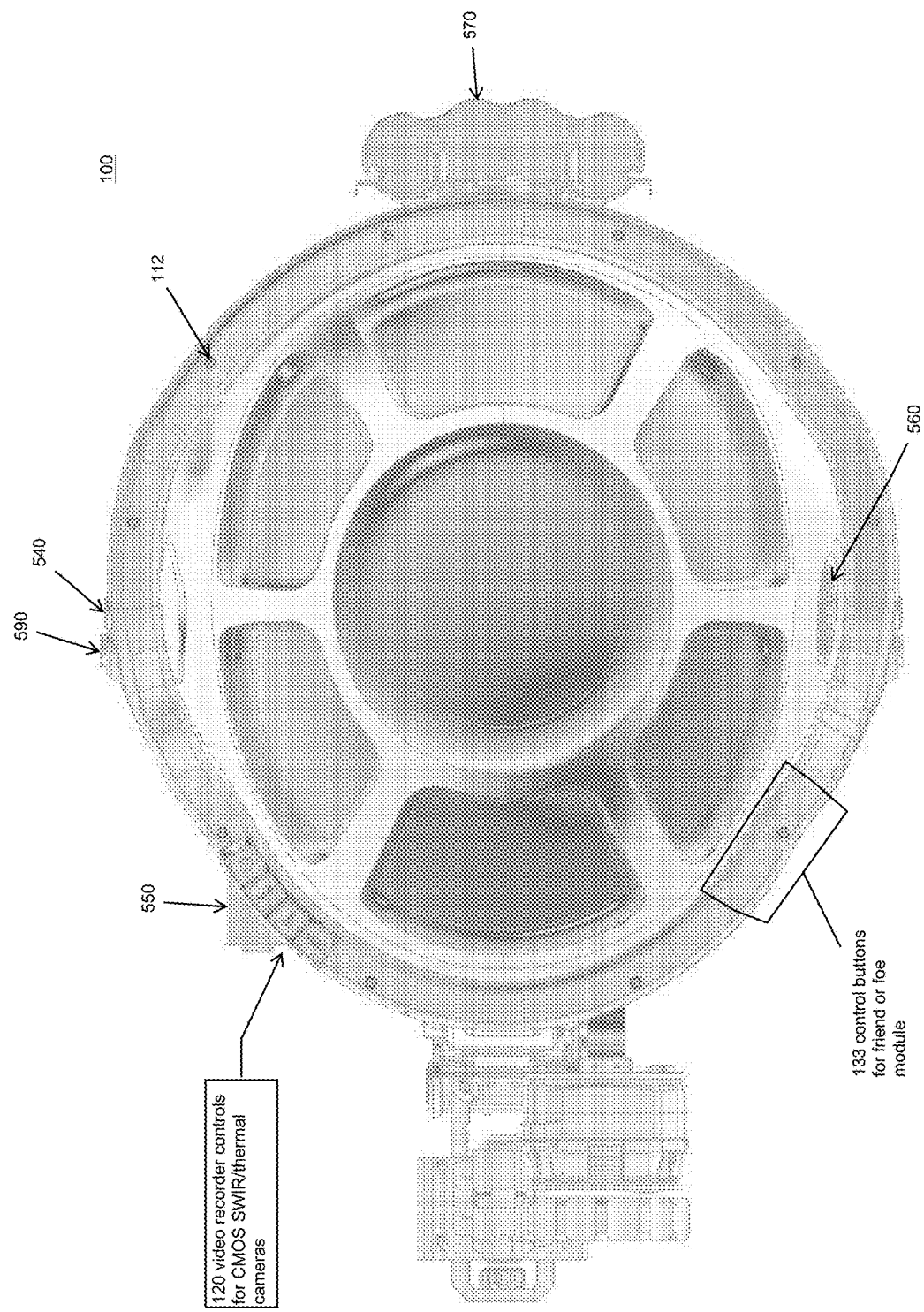
FIG. 5 is a bottom view of the embodiment appearing in FIG. 1.

In certain embodiments, as best seen in FIG. 5, the brim 110 of the helmet 100 may further comprise a housing 115 that wraps in part or entirely around the brim 110 of the helmet 100. An annular printed circuit substrate 430 is received within the brim housing 115 and electrically couples the circuit substrate elements 420.

The brim housing 115 may contain buttons, keypads, or the like, for controlling the functions and devices integrated into the helmet 100, such as controls 120 for a video recorder(s) and controls 133 for an IFF module 130. In preferred embodiments, the controls 120, 133 are situated towards the front of the helmet such that they are accessible by the wearer while the helmet is in use.

In certain embodiments, as best seen in FIG. 12, the helmet may include a combat identification system, such as a secure covert identification friend or foe (IFF) system. In certain embodiments, the IFF system comprises one or more modules 130 incorporated into the housing 115. The IFF module 130 further comprises one or more LED lights 131, which may emit in one or more wavelengths including, but not limited to, infrared (IR), visible, off band short wave infrared (SWIR), among others. In certain embodiments, the IFF module 130 further includes a receiver/responder 132 for responding to an encoded laser interrogation signal. It is contemplated that the IFF module 130 may be located elsewhere on the helmet 100.

The IFF module 130 further includes LED driver circuitry for controlling the LED lights 131. Buttons 133 may be provided for actuating the LED elements. Exemplary button functions include powering on, powering off, blink, blink rate, SOS signals, and so forth. Such controls 133 may be located on the brim housing 115. In alternative embodiments, a graphical interface for controlling the LED lights 131 through a screen display 535 (e.g., via a graphical user interface or a hierarchy of menu commands) may be provided.

In certain embodiments, the circuit layer 400 of the helmet 100 comprises one or more video and/or control circuit boards 410 for controlling one or more image sensors and cameras integrated into the helmet 100. In certain embodiments, the helmet 100 includes one or more complementary cameras employing photo sensitive arrays, such as metal oxide semiconductor (CMOS) image sensors, CCD arrays, or the like positioned around the helmet. In the illustrated embodiments, the helmet system comprises a low lux camera 550, left and right side cameras 590, and a rear camera 580.

In certain embodiments, a positioning system, such as a celestial camera system 520, is positioned at the top of the helmet 100, for calculating the position of the wearer. In certain embodiments, the celestial camera system 520 may also aid in positioning weapons. The celestial camera system 520 includes at least one sensor for imaging the sky and/or at least one celestial object and associated control logic and memory programmed with a celestial catalog of known positions of at least one celestial object at various times. The celestial camera system 520 further comprises control logic for calculating a user's position based on the images captured by the camera and known positions of the celestial object as provided by the celestial catalog. In alternative embodiments, the celestial camera system 520 may transmit data to a remote database of known positions of celestial objects at various times for reference and/or calculation through the algorithms to determine location. In certain embodiments, as an alternative or additional positioning system, a digital compass and/or a telemetry device to establish magnetic azimuth, gyroscopic azimuth and elevation, is provided on the helmet 100.

The video controls 120 may include a plurality of buttons, allowing the user to navigate an on-screen interface, e.g., a menu-based or other graphical interface, displayed on the display screen 535 for controlling operation of the camera system 520 and/or other cameras integrated into the helmet, such as the cameras 550, 580, 590. The controls may optionally include a dedicated power button, which may be omitted, wherein the camera system can be powered on via one or more of the buttons, including through button press combinations and/or sequences, and/or through a "power off" option available through the on-screen interface.

Each image sensor may automatically transmit images to a display screen 535, such as a liquid crystal display (LCD), light emitting diode (LED) display, or organic light emitting diode (OLED) display, or the like. The display screen 535 may also be integrated into the helmet, such that the display screen 535 is viewable by the wearer. In certain embodiments, the display screen 535 is removably attached to the helmet 100, such that the display screen 535 is viewable by the wearer when attached.

In certain embodiments, the helmet may include one or more motion sensors 540, positioned around the helmet 100. Such sensors may be passive infrared, ultrasonic, microwave, or image sensor based motion detectors. Such motion sensors 540 may notify the wearer of activity detected from a certain direction through an alert, such as sound notification via audio speakers 560 disposed in the helmet 100 and/or a separate earpiece, headset, or the like (not shown) worn by the user. Additionally or alternatively, the motion sensors 540 may communicate with the display screen 535 to display information regarding activity detected from a certain direction. In still further embodiments, a silent alert device 565 may be provided on the helmet, such as a haptic alert device. In certain embodiments, the silent alert device 565 is a vibration motor having an eccentric rotating mass. In this manner, the one or more of the integrated motion sensors or cameras function as a warning system, e.g., for warning the wearer of a potential intruder in the vicinity and the direction from which the intruder is approaching.

In certain further embodiments, the cameras may be activated by proximity and/or motion detectors. Motion detectors 540 may be programmed with timing control logic, such that detected motion for a period of time will activate a video controller 410, triggering transmission of images or video captured by the camera to be transmitted to display screen 535.

In certain embodiments, the helmet system includes a mounting assembly to removably attach an additional device to the helmet 100. In the illustrated embodiment, a viewing device 530 is removably attached and positioned such that the viewing device 530 is positioned in front of an eye of the user. In certain embodiments, the mounting assembly includes a pivot assembly to allow the viewing device to pivot away from the user's line of sight to a stowed position when the camera is not in use.

Figure 6:
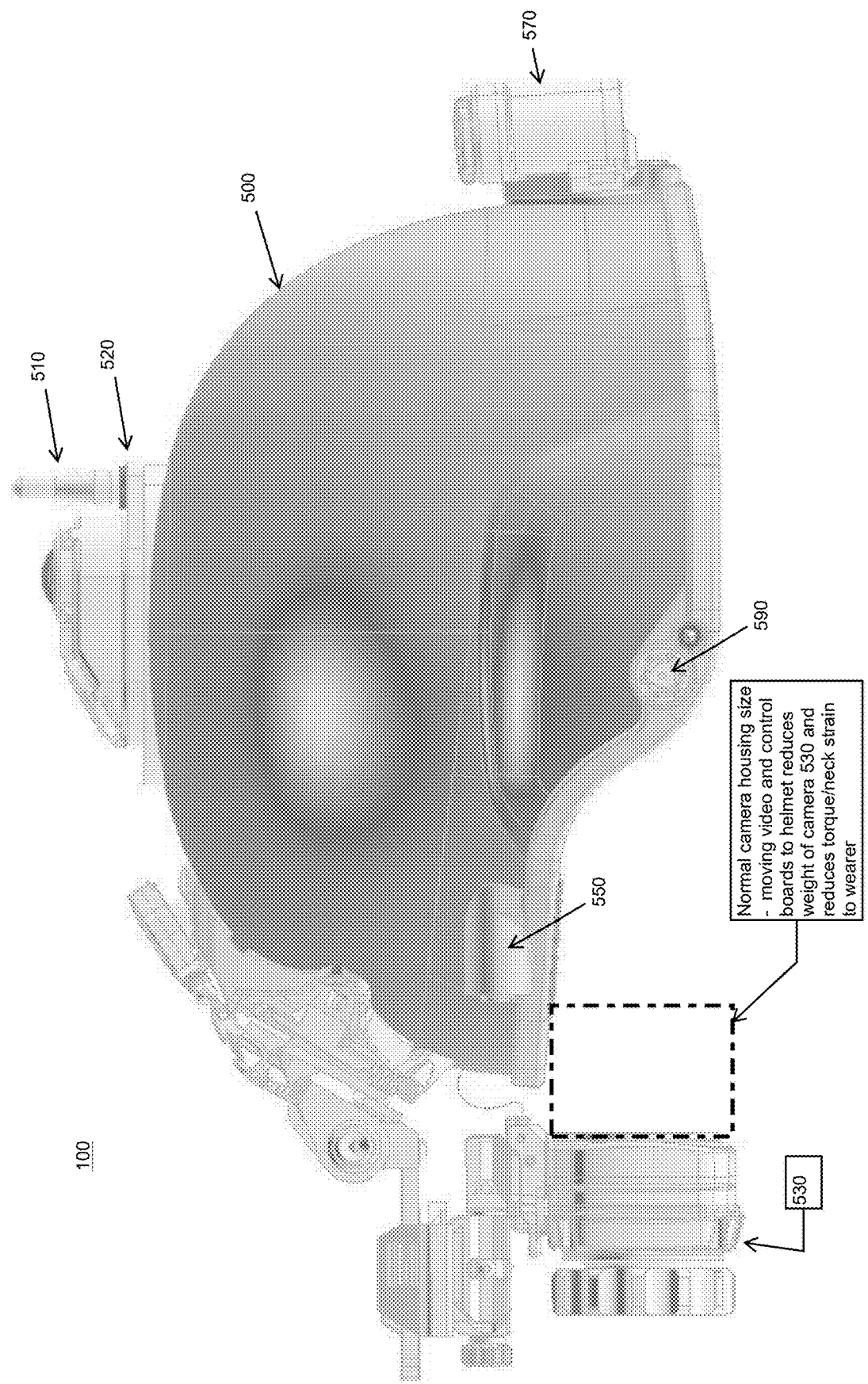
FIG. 6 is a left side elevation view of the embodiment appearing in FIG. 1.
Figure 7:
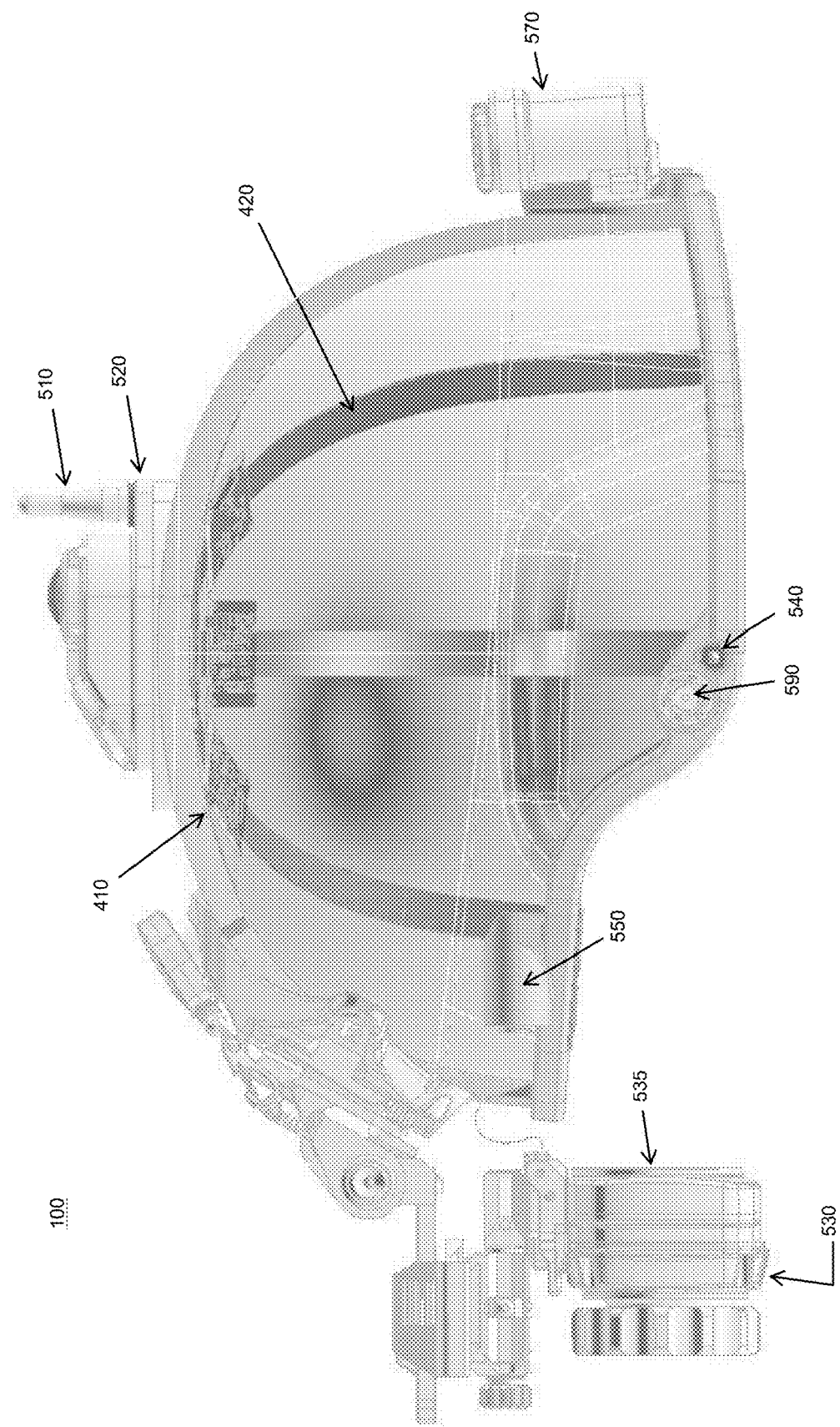
FIG. 7 is a left side elevation view of the embodiment appearing in FIG. 1, with the outer layer removed for ease of illustration.
Figure 8:
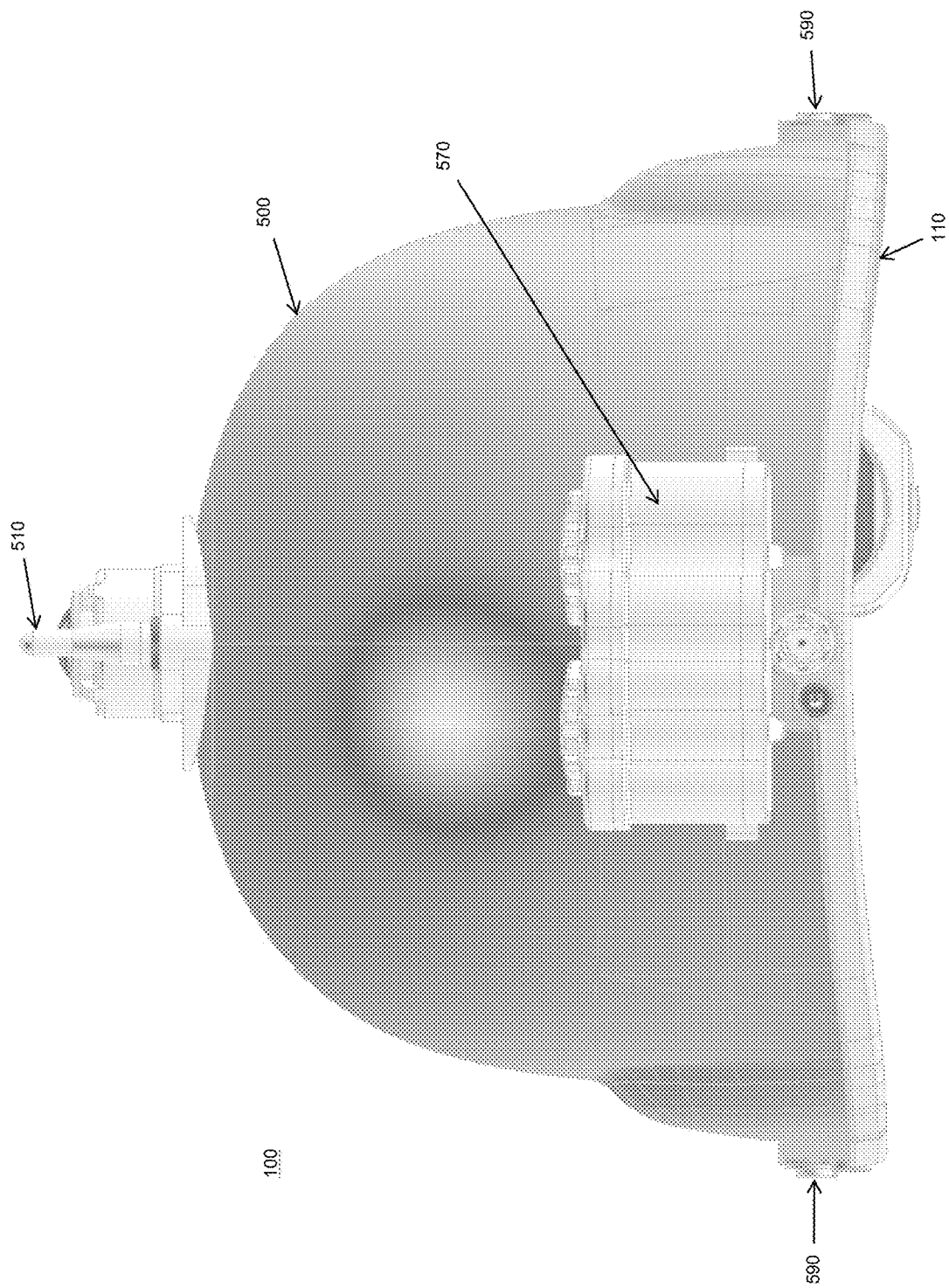
FIG. 8 is a rear elevation view of the embodiment appearing in FIG. 1.
Figure 9:
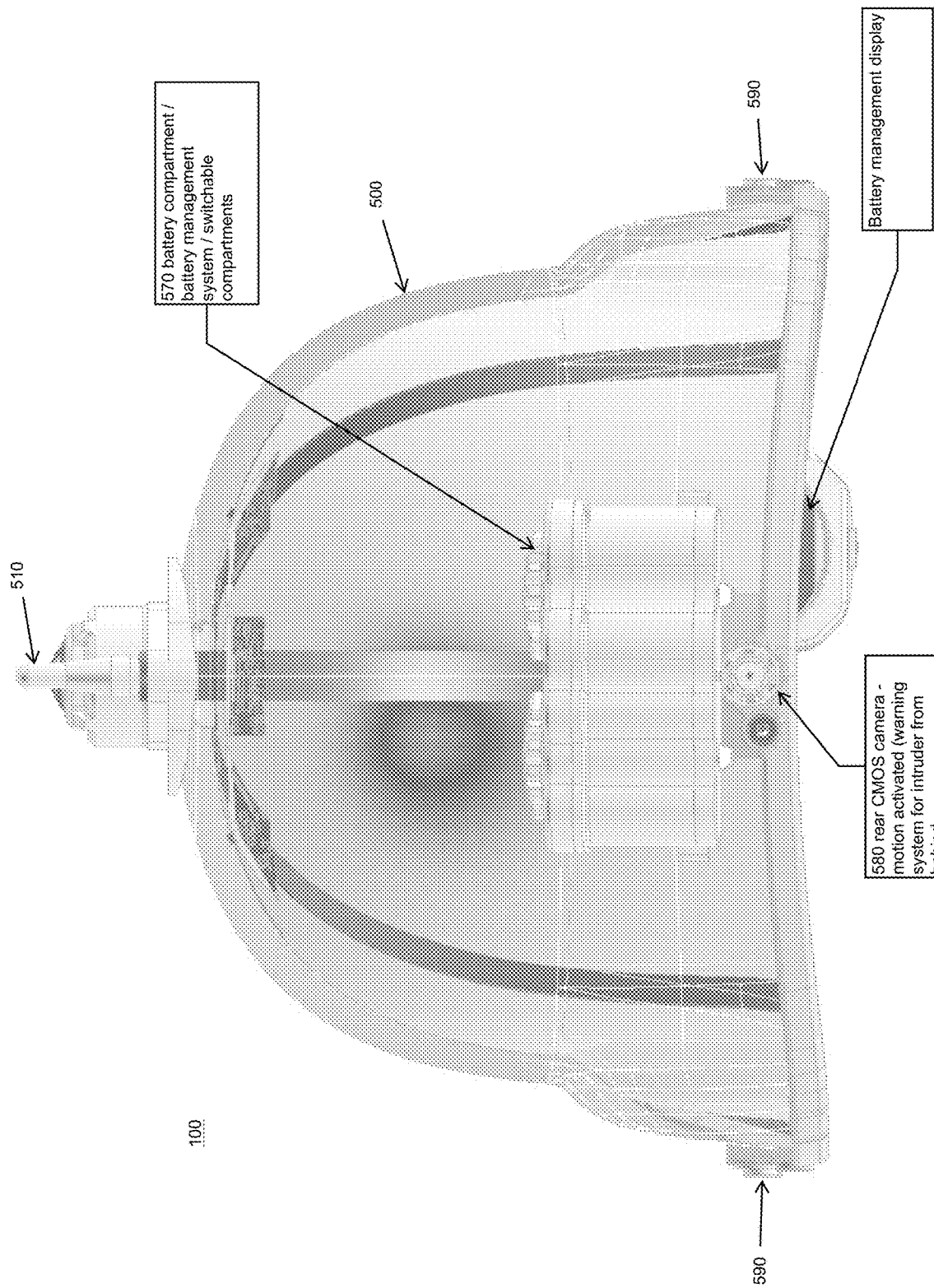
FIG. 9 is a rear elevation view of the embodiment appearing in FIG. 1, with the outer layer removed for ease of illustration.
Figure 10:
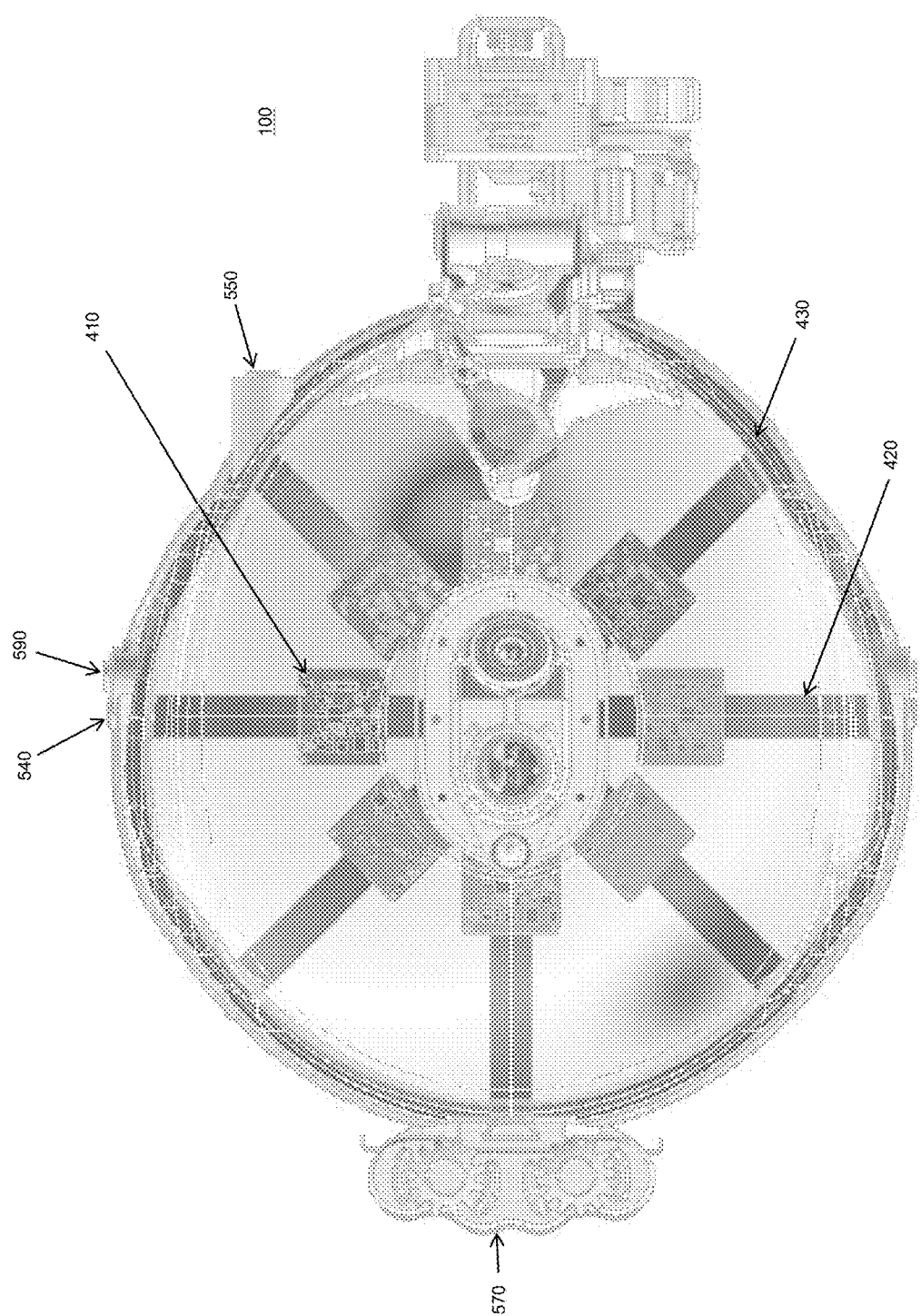
FIG. 10 is a top view of the embodiment appearing in FIG. 1, with the outer layer removed for ease of illustration.
Figure 11:
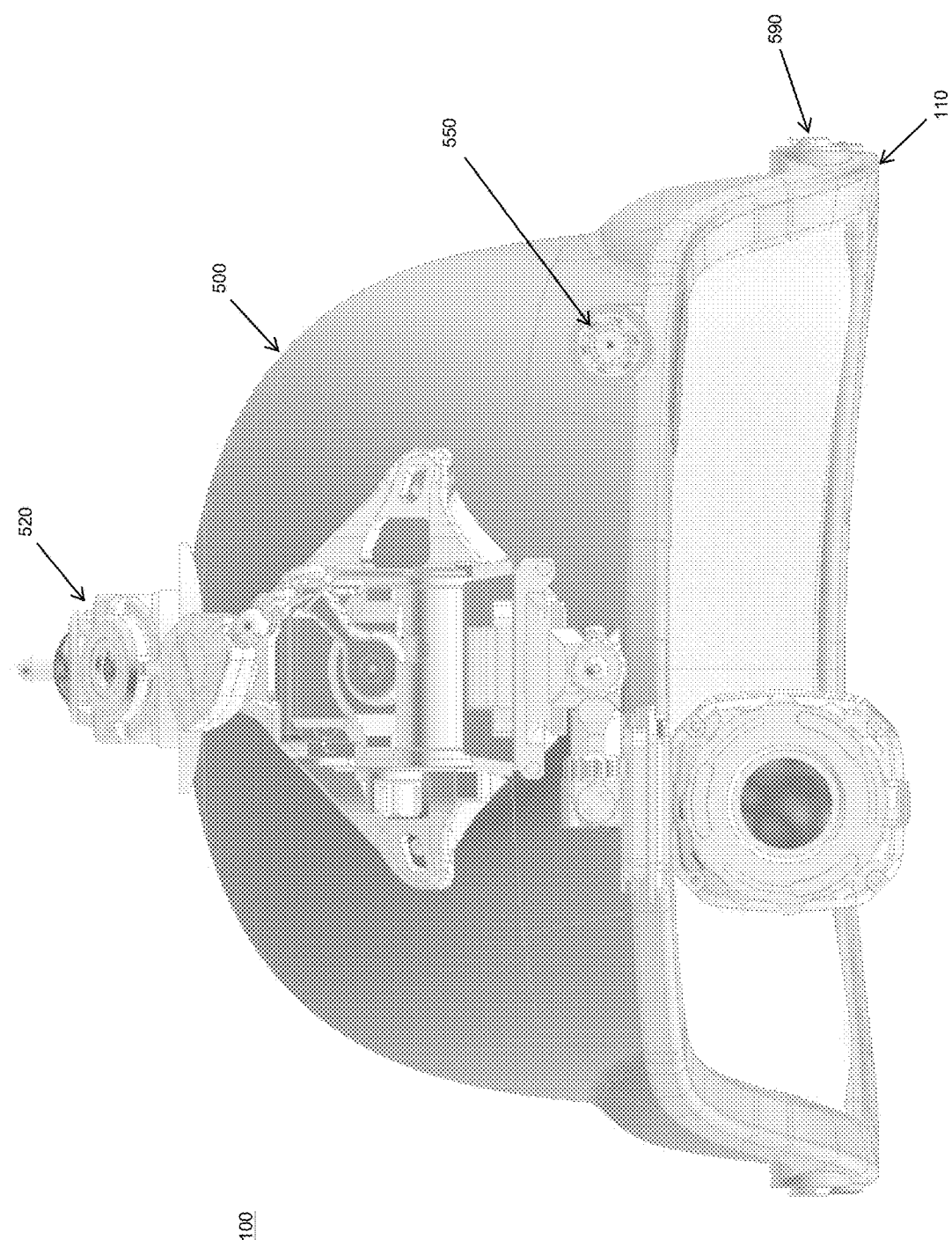
FIG. 11 is a front elevation view of the embodiment appearing in FIG. 1.

In certain embodiments, the viewing device 530 is a camera system. In certain embodiments, the video and control circuit boards 410 are integrated into the helmet 100, allowing the viewing device 530 may be reduced in size and weight. As best seen in FIGS. 6 and 7, reducing the size and weight of the hearing device 530 allows for more even weight distribution, left neck strain, and increased visibility for the helmet wearer. In certain embodiments, the camera system 530 comprises a photosensor element and a human viewable display. In certain embodiments, the photosensor is sensitive to infrared (IR) radiation. In preferred embodiments, the photosensor is sensitive to radiation in the short wave infrared (SWIR) region and may be, for example, an indium gallium arsenide (InGaAs) sensor. In certain embodiments, the viewing device the photosensor could be a visible light imaging sensor or a thermal imaging sensor. In certain embodiments, the viewing device 530 is a night vision device employing a photomultiplier tube, such as in NVG device or an enhanced NVG device.

In certain embodiments, the display screen 535 is removably attached to the helmet. In certain embodiments, the display screen 535 is adjacent to the camera system, positioned to face the eye of the user.

In alternative embodiments, the viewing device 530 may be a night vision goggle (monocular or binocular) device or other optical or imaging device, such as thermal or infrared (IR) devices, including SWIR devices, head mounted displays (such as head-up displays, immersive displays, etc.), or other type of device.

A radio frequency (RF) antenna 510 is coupled to the RF transceiver (e.g., Bluetooth) 412 received in the helmet 100, to allow the helmet 100 to communicate with teammates wearing the same or similar devices. In certain embodiments, the helmet 100 includes one or more audio speakers 560 on the inner surface of the helmet, e.g., positioned to be close to the ears of the wearer. In alternative embodiments, earphones or like wearable earpiece communicating with the helmet via an RF interface (e.g., Bluetooth) may be used. The audio speakers 560 and/or earphones/ear piece may output audio associated with video images shown on the screen display 535. In certain embodiments, the audio speakers 560 and/or earphones/ear piece provide audio output from a weapon system to provide audible information from the weapon system.

The display screen 535 and/or the audio speakers 560 or earphones may be used to communicate distress signals from teammates as well as provide the location of teammates. For example, in certain embodiments, the geographic location of one team member may pop up on the display screens of other teammates upon issuance of a distress signal.

In certain embodiments, the one or more RF receivers includes a receiver for receiving data from sensors external to the helmet 100. In certain embodiments, the external sensor(s) comprise one or more sensors 700 located around the body of the user.

In certain embodiments, an acoustical ring is embedded around the brim 110 of the helmet 100. The acoustical ring comprises an array of small microphones 112 embedded in the brim housing 115 configured to pick up directional sound. A processor 414 processes the signals from the microphones and outputs an audio signal to an audio output device, such as an audio amplifier coupled to the speakers 560 and/or an RF (e.g., Bluetooth) ear piece, earphone, headset or the like. In certain embodiments, the acoustical ring is used to provide a noise cancelling function to the helmet audio system, e.g., using digital signal processing or like circuitry to output an inverted or phase shifted waveform of the ambient noise to reduce the ambient noise through destructive interference.

Audible output to the soldier may be via a wireless (e.g., Bluetooth) ear piece or head set worn by the user and/or the audio speakers 560 within the helmet. In certain embodiments, the audio output is audible output of sound received by acoustical ring. In certain embodiments, the audio output includes include weapon information received from a weapon-mounted round counter, warning notices or alerts from the cameras mounted and/or motion sensors around the helmet. Such alerts may be spoken alerts, e.g., generated using synthetic speech or via audible playback of prerecorded digital sound files.

In certain embodiments, the helmet-mounted cameras include an image recognition software function for sensing an intruder or any other potential threat within the cameras' field of view. In such embodiments, other information to be communicated to the user includes information transmitted from one or more weapon-mounted sensors to the RF transceiver(s) 412.

As an alternative to (or in addition to) audio output, data, alerts, warnings, or the like can be projected in human viewable form through the display 535 and/or a head up display 536. In certain embodiments, the head up display takes the form of a visor 537 attached to the helmet 100 via a helmet-mounted bracket 538. The visor includes one or more projectors 539 for projecting the indicia onto the visor 537 wherein is reflected to an eye of the user. In certain embodiments, the helmet-mounted bracket 538 is configured to mount the head up display 536 in front of either the right or left eye of the user. In certain embodiments, the helmet-mounted bracket 538 is configured to mount the head up display 536 in both the right and left eye of the user.

In certain embodiments, the helmet system 100 is configured to receive signals, e.g., via wireless transmission, with one or more sensors (not shown) located on or around the body of the user to monitor impact to the user. The helmet system 100 may alternatively or additionally communicate with sensors (not shown) include as part of a vital sign monitoring system for sensing one or more vital signs or health conditions of the wearer, such as heart rate, body temperature, respiratory rate, and so forth. The impact/vital sign monitoring system may send the detected information to one or more receiving points in the helmet, which may include an RF communication interface via the one or more RF transceivers 412 or cabled or hard-wired communication link. In certain embodiments, the one or more RF transceivers 412 may, in turn, send the information gathered from the helmet systems and associated sensors and transmit such information to, for example, a hospital, a triage center, or a central command center for monitoring the user's information.

Other sensors contemplated include a satellite-based positioning system (e.g., GPS) receiver 416 for determining positional information of the user and a thermometer (e.g., thermistor-based temperature sensor) 418 for sensing ambient air temperature and other environmental factors. Information from such sensors may be accessed through and displayed on the screen display, using voice commands and/or controls located on the helmet 100.

In certain embodiments, a directional 3-axis telemetry 422 sensor is provided on one of the helmet logic boards 410. The purpose of the 3-axis telemetry sensor is to be able to know the position of the helmet in an X, Y, Z point cloud.

In the illustrated embodiments, a battery pack 570 includes a mount which removably receives a powered shoe on a rear helmet bracket. Electrical conductors 420 pass over, under, or within the helmet 100 and electrically couple each electrically powered function or device received in the helmet 100 as well as to the viewing device 530.

Certain embodiments of the helmet 100 include fixed contact pins/pads mounted to printed circuit board (PCB) embedded in the helmet to provide for the transmission of power and/or data signals between the battery back 570 and the electrically powered functions and devices integrated into the helmet 100.

In an alternative embodiment, the helmet and any additional devices may be powered by a battery management system (not illustrated) operable to provide power via the helmet system 100 to one or more functions or devices received in the helmet. A battery compartment includes mounting rails for connection to the rear of the helmet. The battery compartment may be secured in position via threaded fasteners. In certain embodiments, the battery compartment 570 may be as shown and described in commonly owned U.S. application Ser. No. 15/404,505 filed Jan. 12, 2017, now U.S. Publication No. 2017/0205202, the entire contents of which are incorporated herein by reference.

The battery compartment 570 includes a housing 571 with one or more rear covers 572 which houses one or more (two in the illustrated embodiment) batteries within an interior compartment thereof. In certain embodiments, the batteries are 3-volt lithium batteries such as CR123 batteries. In certain embodiments, the batteries may be rechargeable batteries. The housing 571 includes removable covers 572 for providing access to the interior compartment of the housing for inserting or replacing the battery cells. The helmet 100 includes an electrical mounting shoe 573 having electrical contacts or terminals in electrical communication with the circuit elements. The shoe 573 removably interfaces with a complementary receptacle 574 on the housing 571. The receptacle includes contacts or terminals which are electrically coupled to the battery cells and aligned with the electrical contacts on the mounting shoe 573.

In certain embodiments, electrical circuitry within the battery compartment is provided to couple the terminals of the cells, in series or in parallel, to the circuitry of the helmet 100. Alternatively, electrical circuitry within the battery compartment is provided to individually couple the terminals of a selected cell battery within compartment 570 to the circuitry of the helmet 100, as discussed below.

In certain embodiments, an electrical connector assembly includes a circuit substrate carrying an electrical connector which mates with an aligned, complementary connector element within the helmet 100. The circuit substrate is received within an opening in the housing. Pins extend through an opening in a cover, which is secured to the substrate and housing via threaded fasteners. Sealing rings or gaskets are provided on either side of the substrate to protect against entry of external contamination or moisture into the interior compartment.

The electrical circuitry within the battery compartment includes a switch for selective electrical coupling of a selected one of the batteries to the connector, such as a rotary switch on a circuit board. The switch includes a lever which is pivotal between a first position in which battery is coupled to the connector and position in which battery is coupled to the connector, as well as an intermediate "OFF" position in which neither battery is electrically coupled to the connector. The lever may include a spring biased detent assembly to provide positive retention in the desired position and resist against inadvertent movement of the lever from the desired position.

In operation, one of the batteries (e.g., battery when the lever is in the first position) is used to power the helmet system 100. When the battery is depleted, the user may manually throw the lever to the other position (e.g., the second position) to continue powering the helmet system 100. Preferably, each battery is individually swappable such that when one cell is depleted it can be changed without affecting operation of the helmet system 100.

The invention has been described with reference to the preferred embodiments. Modifications and alterations will occur to others upon a reading and understanding of the preceding detailed description. It is intended that the invention be construed as including all such modifications and alterations.

What is claimed is:

1. An integrated helmet system comprising:
a base layer defining a helmet portion;
a circuit layer, wherein the circuit layer is attached to the helmet portion;
a brim housing circumferentially receiving a brim of the helmet system, the brim housing having at least one powered device embedded therein, the at least one powered device electrically connected to the circuit layer, wherein the at least one powered device is selected from the group consisting of one or more cameras, one or more motion sensors, or a combination thereof;
an outer layer configured to retain the circuit layer; and
an inner liner cover which is situated between the circuit layer and the outer layer.

2. The integrated helmet system of claim 1, wherein the circuit layer further comprises one or more circuit substrates.

3. The integrated helmet system of claim 2, wherein the one or more circuit substrates is formed of a flexible material.

4. The integrated helmet system of claim 3, wherein the flexible material is capable of withstanding high temperatures.

5. The integrated helmet system of claim 2, wherein each of the one or more circuit substrates further comprises one or more conductive pathways for transmitting power, control, and data signals.

6. The integrated helmet system of claim 2, wherein each of the one or more circuit substrates further comprises one or more antennas, wherein the one or more antennas are electrically coupled to a communications device.

7. The integrated helmet system of claim 6, wherein the one or more antennas are selected from the group consisting of radio-frequency identification (RFID) antennas for coupling to an RFID device and global positioning system (GPS) antennas for coupling to a navigation system.

8. The integrated helmet system of claim 2, wherein at least one of the one or more circuit substrates further comprises a video controller.

9. The integrated helmet system of claim 1, further comprising one or more helmet accessory devices selected from the group consisting of flashlights, illumination devices, passive night vision devices, enhanced night vision devices, thermal imaging devices, cameras, video recorders, and friend or foe identification (IFF) devices, or any combination thereof.

10. The integrated helmet system of claim 9, wherein the helmet system further comprises a control means for controlling operation of one or both of the at least one powered device and the one or more helmet accessories, wherein the control means is selected from the group consisting of one or more push buttons, a keypad associated with the at least one powered device, and an on screen interface displayed on a display screen associated with the at least one powered device.

11. The integrated helmet system of claim 9, wherein the one or more helmet accessories includes a positioning system.

12. The integrated helmet system of claim 11, wherein the positioning system is selected from the group consisting of celestial camera systems, digital compasses, and telemetry devices.

13. The integrated helmet system of claim 1, wherein the the at least one powered device comprises a plurality of motion sensors spaced apart along the brim housing.

14. The integrated helmet system of claim 13, wherein the at least one powered device further comprises one or more cameras and wherein the plurality of motion sensors are operatively coupled with the one or more cameras, and wherein detection of an outside motion by the plurality of motion sensors activates transmission of images from the one or more cameras to a user-viewable display screen.

15. The integrated helmet system of claim 13, wherein the plurality of motion sensors are operatively coupled with one or more audio speakers, wherein detection of an outside motion by the plurality of motion sensors activates an aural alert.

16. The integrated helmet system of claim 1, further comprising a mounting assembly for mounting an accessory device, wherein said mounting assembly is removably attached to the helmet portion.

17. The integrated helmet system of claim 16, wherein the accessory device is selected from the group consisting of camera systems, night vision goggle devices, thermal imaging devices, infrared imaging devices, and head mounted displays.

18. The integrated helmet system of claim 1, further comprising an acoustical ring having at least one microphone embedded within the brim housing for detecting directional sound.

19. The integrated helmet system of claim 1, further comprising one or more body sensors communicatively coupled to the helmet portion.

20. The integrated helmet system of claim 19, wherein at least one of the one or more body sensors is configured to monitor impact.

21. The integrated helmet system of claim 19, wherein at least one of the one or more body sensors if configured to monitor vital signs of a user.

22. The integrated helmet system of claim 1, further comprising a radio frequency (RF) antenna coupled to an RF transceiver received in the helmet portion.

23. The integrated helmet system of claim 1, wherein the helmet portion is formed of a ballistic-resistant material.

24. The integrated helmet system of claim 1, further comprising a power source coupled to the helmet system.

25. The integrated helmet system of claim 1, further comprising one or more control buttons integral with the brim housing, the control buttons the for controlling operation of the at least one powered device.

\* \* \* \* \*